Nov. 10, 1959  J. DRABIK ET AL  2,911,998
GAS PRESSURE REGULATOR
Filed Dec. 29, 1954  2 Sheets-Sheet 1

United States Patent Office 2,911,998
Patented Nov. 10, 1959

2,911,998

GAS PRESSURE REGULATOR

Josef Drabik, near Osnabruck, Franz Rings, Nahne, near Osnabruck, and Ludwig Vogel, Osnabruck, Germany, assignors to G. Kromschroder Aktiengesellschaft, Osnabruck, Germany Application December 29, 1954, Serial No. 478,322

Claims priority, application Germany January 25, 1954

3 Claims. (Cl. 137—505.25)

This invention relates to gas pressure regulators and particularly to a regulator structure adapted for series connections in a double gas line wherein the flow conduits are concentric. The principal object of the invention is to provide a very compact gas pressure regulator having connecting sockets for the convenient connection of the apparatus in double conduit gas line.

The invention is more fully described by means of several embodiments illustrated in cross-section in the accompanying drawings.

Figure 1:
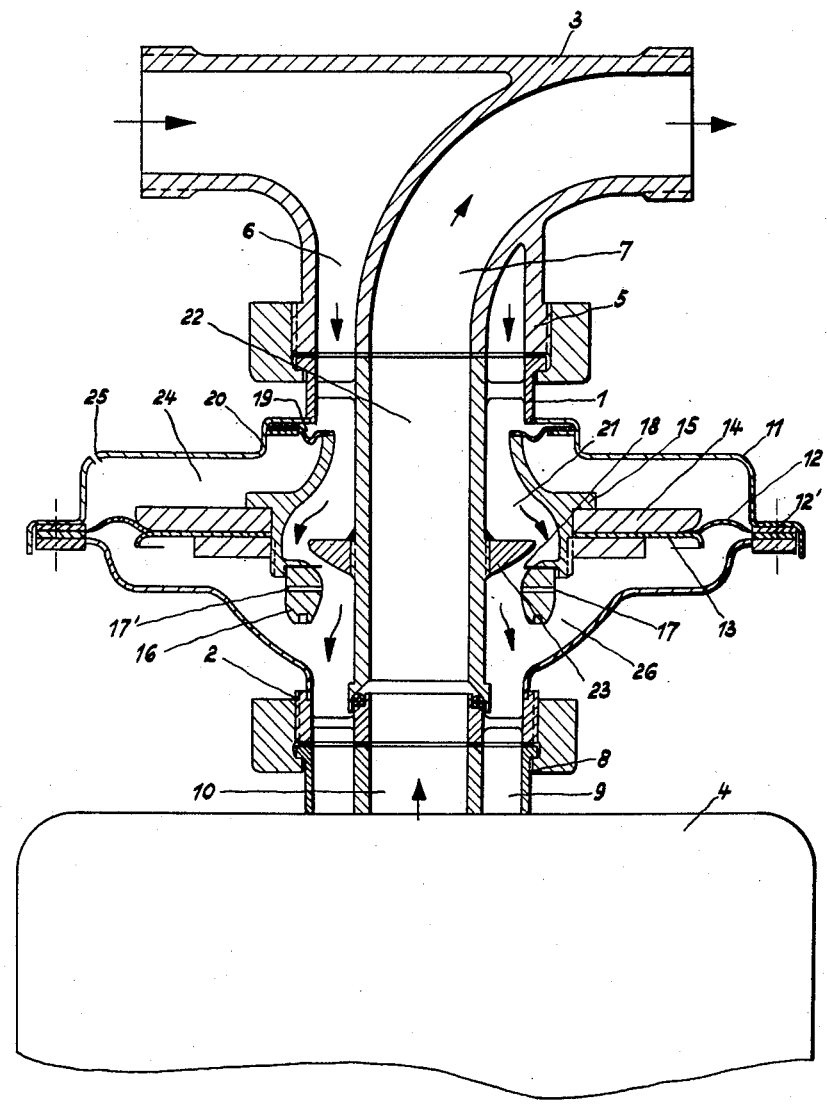
Figure 2:
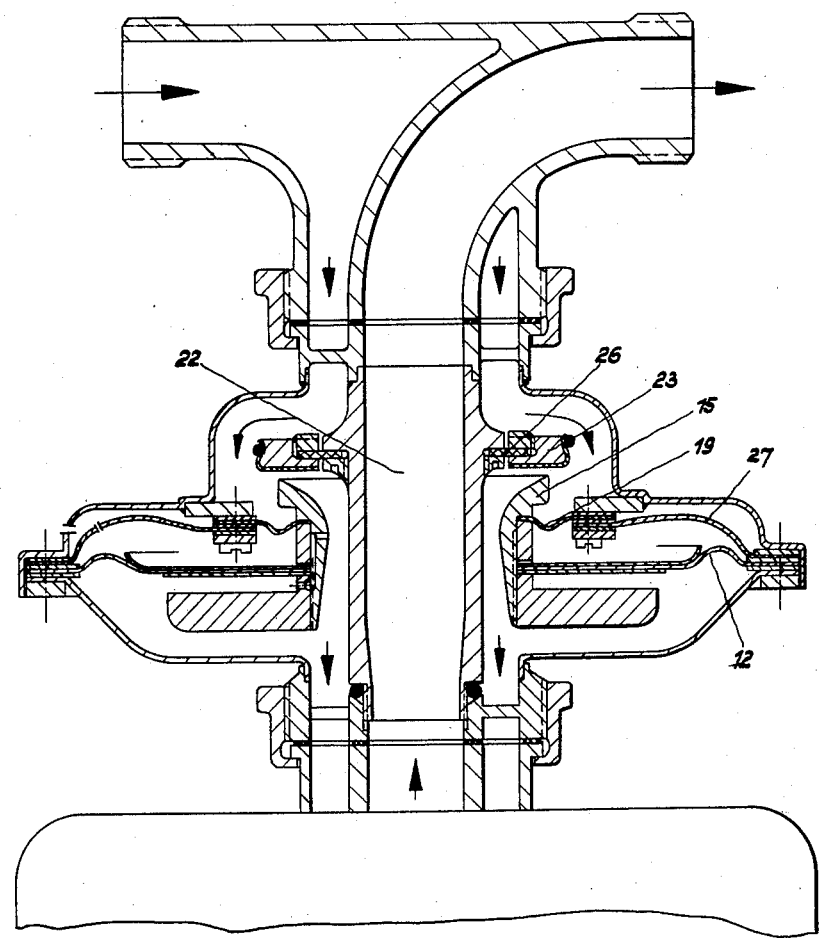

Figs. 1 and 2 show two different embodiments of the connection of a gas meter with a pressure regulator connected in front of the meter.

Fig. 1 shows a pressure regulator designed as an intermediary piece. This pressure regulator is mounted by means of two double connecting socket pieces 1, 2 with concentric inlets and outlets, between a pipe connecting piece 3 and a gas meter 4. The piece or fitting 3 has also such a double-connecting socket 5, the outside duct 6 of which is connected with the supply conduit of a gas main, the inside duct 7 leading to the consumer end of this main. The gas meter 4 is provided with a double-connecting socket 8, the outside duct 9 of which forms the inlet and the inside duct 10 of which forms the outlet of the meter. Sockets 1 and 5 are complementary, as are sockets 2 and 8, in that they mate with each other to make the necessary fluid connections, and it follows that sockets 1 and 2 are also complementary so that socket 8 could, if desired, be connected with socket 5 for direct connection of the meter with sidebranch fitting 3. The numeral 11 is the housing of the pressure regulator. An annular working diaphragm 12 is fitted with its outer rim 12' to this pressure regulator housing 11. The working diaphragm 12 carries a diaphragm disc 13 which has annular shape, and an annular weight 14. At its inner rim, the working diaphragm carries also a valve body 15.

This valve seat body 15 consists of the enlarged valve seat which is designed in the manner of a venturi tube at its inner side, the suction area of the venturi tube shaped portion being provided with radial bores 17, 17'. These channels 17, 17' open into the space located directly beneath the working diaphragm 12. The valve seat carries also a valve seat ring 18 made of flexible material. The valve body 15 extends upwards nearly into the upper double-connecting socket 1 of the pressure regulator and is there sealed by an annular diaphragm 19 but being movably connected with the upper part 20 of regulator housing 11. Together with the diaphragm 19 and the regulator connecting socket 1, the upper part of the valve seat body 15 forms a bottle neck shaped duct 21 which is slightly enlarged downwards and then is contracted by the valve seat 16.

The duct 22 connecting the two inside ducts of the double-connecting socket 1, 2 with each other penetrates the opening of the valve seat body 15. Above the valve seat body 16, an annular valve seat 23 is fixed to the wall of this connecting duct 22, this valve seat encircling the duct 22.

The space 24 defined by the regulator housing 11, the working diaphragm 12, the valve seat body 15 and the diaphragm 19, communicates with the atmospheric pressure through breather nozzle 25. Between the regulator housing 11 and the lower part 16 of the valve seat body 15, there is a contraction 26 where a dynamic drop of pressure can develop.

The gas flows in the direction of the arrow from the supply end of the gas main into the pipe connecting piece 3 and through the outside annular ducts of the double-connecting sockets 5 and 1 into the pressure regulator. It flows through the guide duct 21 and through the regulating area which is formed by the valve seat 23 and the valve seat ring 18 into the inlet duct 9 of the gas meter connecting branch 8. The valve seat 23 of the regulating valve is fixed at this place, while the valve seat body 16 is movably mounted together with the working diaphragm 12. After passing the meter 4, the gas flows through the connecting duct 22 which is joined to the gas meter outlet 10 into the pipe connecting piece 3 connected with the consumer pipe.

As usual, the regulator action is determined by the counteraction of the weight 14 pushing the working diaphragm downwards and by the counterpressure acting upwards. The atmospheric pressure zone 24 surrounds the two ducts 21 and 22 which lead to the gas meter and return. The annular diaphragm 19 connects the valve body 15 with the upper part of the regulator housing; the diaphragm 19 acting in known manner simultaneously as a compensating diaphragm is acted upon on the one hand by the atmospheric pressure and by the regulator inlet pressure on the other.

In the suction area of the venturi tube shaped lower part 16 of valve body 15, there are radial channels 17 opening under the working diaphragm 12. Through the action of suction, an underpressure is thus superimposed by the shortest possible way to the backpressure acting under the work diaphragm 12. This underpressure increases with an increasing regulating effect; the dropping characteristic of the regulator is compensated in known manner.

Fig. 2 shows a somewhat different design of a pressure regulator according to the invention.

In this case, the valve body 15 projects upwards somewhat over the compensating diaphragm 19 and in the closed position of the valve adjoins with its upper front area the lower side of the annular valve seat 23. This valve seat 23 is fastened to the wall of connecting duct 22 by means of a yielding holding means 23'. In this manner the valve seat 23 can in each closing position exactly adapt itself to the valve body 15 thus ensuring a reliable sealing.

The regulator shown in Fig. 2 in addition is fitted with a safety diaphrgam 12" acting in known manner. This diaphragm having annular shape is supported at its outer rim by the working diaphragm 12, while the inner rim of the diaphragm 12" is fastened with the outer rim of the compensating diaphragm 19 to reducer housing 11.

We claim:

1. A gas pressure regulator comprising a housing, a tube having a straight median section defining an open-ended channel and defining with said housing a second open-ended channel, said channels terminating at different locations in said housing for the flow of gas through said regulator, the terminal portions of said channels being substantially coterminous and circular and respectively concentric to provide an inner channel inlet and an annular channel outlet at one joint terminus of said channels and an inner channel outlet and an annular channel inlet at the other joint terminus of said channels, an annular valve seat secured on said median section of said tube, and a gas pressure regulator diaphragm valve assembly arranged between said housing and said tube for cooperation with said annular seat to regulate the flow of gas through the annular channel defined by said tube and said housing.

2. A gas pressure regulator in accordance with claim 1 wherein the channels terminate at opposite locations in the housing and the circular terminal portions of one joint channel terminus are coaxial with the circular terminal portions of the other joint channel terminus.

3. A gas pressure regulator in accordance with claim 1 wherein the annular valve seat is yieldingly secured to the tube whereby to permit said seat to adapt itself to the position of cooperating elements of the diaphragm valve assembly.

References Cited in the file of this patent
UNITED STATES PATENTS

| | | |
|---|---|---|
| 139,352 | Andreae | May 27, 1873 |
| 562,957 | Goff | June 30, 1896 |
| 587,125 | Kennedy | July 27, 1897 |
| 2,301,428 | MacNeil | Nov. 10, 1942 |
| 2,465,997 | Boutillon | Apr. 5, 1949 |
| 2,515,252 | Niederer | July 18, 1950 |
| 2,649,769 | Kaiser | Aug. 25, 1953 |
| 2,671,989 | Schwarz | Mar. 16, 1954 |